(12) United States Patent
Roth

(10) Patent No.: US 6,355,192 B1
(45) Date of Patent: Mar. 12, 2002

(54) METHOD OF PRODUCING ARTIFICIAL FOSSIL CORAL

(76) Inventor: Rudy Roth, 3556 Boutwell Rd., Lake Worth, FL (US) 33461

( * ) Notice: Subject to any disclaimer, the term of this patent is extended or adjusted under 35 U.S.C. 154(b) by 0 days.

(21) Appl. No.: 09/726,302

(22) Filed: Nov. 27, 2000

(51) Int. Cl.⁷ .......................... B28B 11/22; B28B 1/50; B28B 1/52; B29C 33/38; B29C 67/20
(52) U.S. Cl. .......................... 264/42; 264/45.3; 264/49; 264/221; 264/317; 264/500; 119/221
(58) Field of Search ................. 264/42, 45.3, 221, 264/317, 500, 49; 119/221

(56) References Cited

U.S. PATENT DOCUMENTS

| | | | | |
|---|---|---|---|---|
| 3,773,602 A | * | 11/1973 | Killmer | 161/19 |
| 4,508,057 A | * | 4/1985 | Suzuki | 119/3 |
| 4,781,721 A | * | 11/1988 | Grundei | 623/13 |
| 4,783,294 A | * | 11/1988 | Kimura et al. | 264/45.3 |
| 4,906,423 A | * | 3/1990 | Frisch | 264/48 |
| 5,564,369 A | * | 10/1996 | Barber et al. | 119/221 |
| 5,803,660 A | * | 9/1998 | Warren et al. | 405/25 |
| 6,189,188 B1 | * | 2/2001 | O'Hare | 27/1 |

FOREIGN PATENT DOCUMENTS

| | | | | |
|---|---|---|---|---|
| FR | 2464152 A | * | 4/1981 | A01K/63/00 |
| JP | 55-7456 A | * | 1/1980 | B44F/9/08 |
| JP | 5-111337 A | * | 5/1993 | 119/253 |

* cited by examiner

Primary Examiner—Jan H. Silbaugh
Assistant Examiner—Michael I. Poe
(74) Attorney, Agent, or Firm—McHale & Slavin

(57) ABSTRACT

A method of producing artificial fossil coral which is an artistic replica of a natural coral reef formed from a slurry of cement, sand, ground PVC chips, colorant and water admixed with artistic rigid lightweight sponge or Styrofoam. Fiber glass strands are used to provide a plant like look to the artificial fossil coral and coloring of the artificial fossil coral duplicates the colors found in natural coral reefs.

5 Claims, No Drawings

METHOD OF PRODUCING ARTIFICIAL FOSSIL CORAL

FIELD OF THE INVENTION

The present invention is directed to a method of producing artificial fossilized coral.

BACKGROUND OF THE INVENTION

Reefs are tropical ecosystems containing layers of living corals, photosynthetic plants, water polyps and algae. Herbivorous fish, such as butterfly fish, sea urchins, sea cucumbers, brittle stars and numerous species of mollusks feed on the algae. Coral reefs found in tropical waters are formed by an accumulation of calcium containing exoskeleton of coral animals. Single celled algae known as zooxanthellae live within the polyps and a skeleton contained filamentous green algae surrounds the polyps.

In addition to the diversity of life provided by a coral reef, coral reefs are known for their breathtaking beauty. Coral is known for the vivid colors making it a beautiful backdrop to exotic fish. Unfortunely, pollution, ultraviolet radiation, global warning, and excess human interaction have caused the loss of coral to occur at an alarming rate. In fact, due to the high rate of destruction to natural reefs, artificial reefs are now playing an important role in providing shelter, food, protection and spawning areas for hundreds of species of fish and other marine organisms. In fact, an ongoing effort is being made to find materials suitable for the construction of artificial reefs such as tires but may include rocks, ships, planes, cars, heavy-gauge steel structures such as oil platforms and fishing piers. In Florida, the most active reef-developing state, nearly everything and anything has been sunk and there are more than 350 sites containing waste products, most of which degrade in seawater. The Florida shore line is littered with items such as dumpsters in St. Augustine, bathtubs in Stuart, a Rolls Royce in Riviera Beach, an airplane in Miami, commodes in Marco Island, buses and Coca Cola trucks in Naples, railroad box cars in Sarasota, and washers and dryers in Ft. Walton Beach.

Thus, while artificial reefs may provide a form of habitat protection, they will never replace the natural beauty of a reef. Unfortunately many in the public realize this and harvest living coral for placement in an aquarium for their own personal enjoyment. This is occurring despite a Florida law that makes it illegal to damage or remove coral.

Aquariums provide entertainment and if properly set up, create a form of living artwork. As with any art, the concept of having the most brilliant colors or otherwise replicate the environment for exotic fish is important. The dilemma is that it is illegal to harvest coral and without coral an aquarium would not be authentic. Currently the use of rocks and basic plastic structures are not capable of replicating the unique detail found in reefs.

Thus what is lacking in the art is an artificial coral reef that will provide a habitat and pictorial backdrop for exotic fish aquariums.

SUMMARY OF THE INVENTION

The instant invention is an artificial or artificial fossil coral reef formed from a mixture of cement and sand employing ground PVC chips and artistic rigid lightweight sponge which are blended to replicate the fossil reef. Fiberglass strands are used to provide a plant like look, color to the mixture is used to duplicate the strong pink to moderate red or reddish orange found in coral reefs. Upon placement in water, the artificial fossil reef provides such a resemblance to the living coral that only an expert can tell the difference.

Thus an objective of the instant invention is to disclose an artificial fossil coral reef for use in aquariums.

Yet another objective of the instant invention is to disclose a non hazardous water resistant structure for use in aquariums for a backdrop and to provide a healthy, realistic fish environment.

Yet still another object to the instant invention is to disclose a low cost method of producing artificial fossil reef that can be shaped to accommodate any size aquarium.

Still another objective of the invention is to disclose a method of coloring artificial fossil rock wherein the mixture caused color variations not possible by hand painting;

Yet still another objective is to teach the use of shell shape imprints to replicate certain reef designs of living coral.

Yet another objection to the instant invention is to provide a fossil reef that is so lifelike that it will discourage the use of real fossil reef to help protect the environment.

Other objectives and advantages of this invention will become apparent from the following description wherein are set forth, by way of example, certain embodiments of this invention.

DETAILED DESCRIPTION OF THE PREFERRED EMBODIMENT

The instant invention is an artificial fossil coral reef formed from a mixture of cement, sand and ground PVC chips having an artistic rigid lightweight sponge providing a forming support structure.

The fossil coral has a base structure formed from granular sand with Portland standard cement. Hydraulic cement, concrete plaster and the like bonding materials also provide suitable results but fail to offer ease of shape forming. Polyvinyl Chloride (PVC), ground into chips, is added to the mixture to provide a shell like look. Color may be added in an amount sufficient to mask the natural cement and sand coloring. But for minor staining, the coloring typically does not bind to the PVC chips. A support structure of artist rigid lightweight sponge, Styrofoam, (multicellular expanded synthetic resinous material, containing polystyrene) or the like expanded polymer that can be dissolved with a cleaner/solvent such as collodion, which contains pyroxlin, ether and alcohol, an environmentally safe non-hazardous cleaner. Upon drying, the dissolved material is removed by the application of the solvent. The solvent dissolves the exposed polymer without affecting the dried mixture of sand and cement. Use of pressurized air forces removal of the solvent, dissolved matter from deep pockets, and to assist in shape forming. Various types of polymer removal chemical may also be employed, such as trichloroethane, but may require special handling.

Fiberglass strands are used to provide a plant like look. The fiberglass strands can further provide structural strength for larger structures. Wax string has been found to be effective in producing a horizontal worm like look. The use of real fish skeletons as a mold provides a fish like look.

Color to the mixture will reproduce the strong pink to moderate red or reddish orange found in coral reefs. Color may also be added after the polymer removal step to provide highlights according to personal preference. Upon placement into the aquarium, the artificial fossil reef provides such a resemblance to the living coral that only an expert can tell the difference. The slurry mixture may all be used in the formation of walls, fountains, furniture, sculptures, and so forth.

It is to be understood that while we have illustrated and described certain forms of our invention, it is not to be limited to the specific forms or arrangement of steps herein described. It will be apparent to those skilled in the art that various changes may be made without departing from the scope of the invention and the invention is not to be considered limited to what is shown in the drawings and described in the specification.

What is claimed is:

1. A method of producing artificial fossil coral comprising the steps of:

mixing sand, Portland standard cement, and polyvinyl chloride chips to form a uniform mixture;

adding water and a colorant to said uniform mixture to make a slurry;

admixing artistic rigid lightweight sponge with said slurry;

shaping said slurry before drying;

drying said slurry after shaping;

chemically removing said artistic rigid lightweight sponge with a solvent after drying to provide said artificial fossil coral which is an artistic replica of a natural coral reef.

2. The method of producing artificial fossil coral according to claim 1 wherein said solvent is collodion cleaner.

3. The method of producing artificial fossil coral according to claim 1 including a step of coloring said coral after chemically removing said sponge.

4. The method of producing artificial fossil coral according to claim 1 including a step of adding fiberglass strands to said mixture; wherein said fiberglass strands provide structural strength and a plant look.

5. The method of producing artificial fossil coral according to claim 1 where pressurized air is used to force removal of said solvent and dissolved sponge matter from said artificial fossil coral and to assist in shaping.

* * * * *